United States Patent Office 3,332,675
Patented July 25, 1967

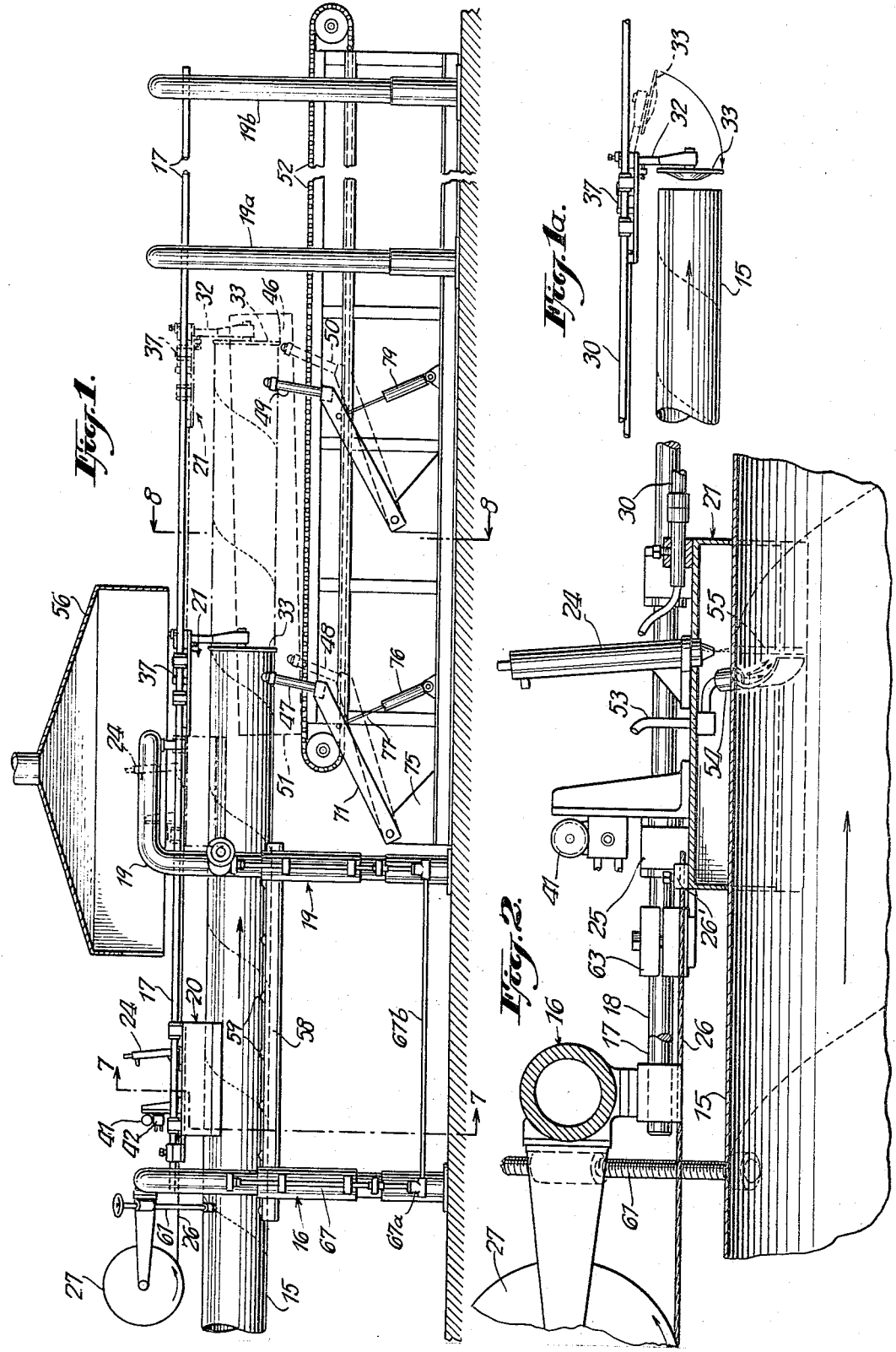

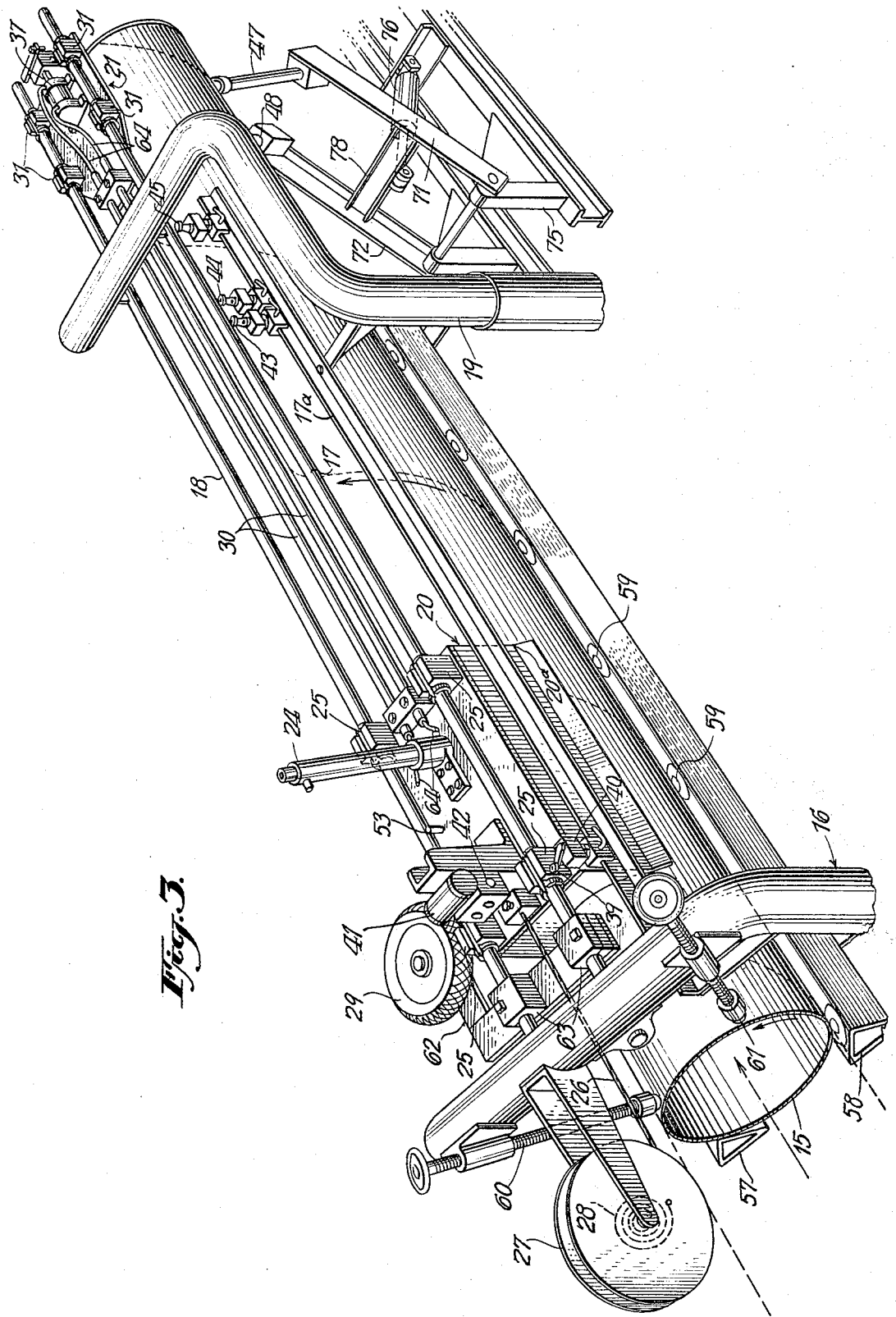

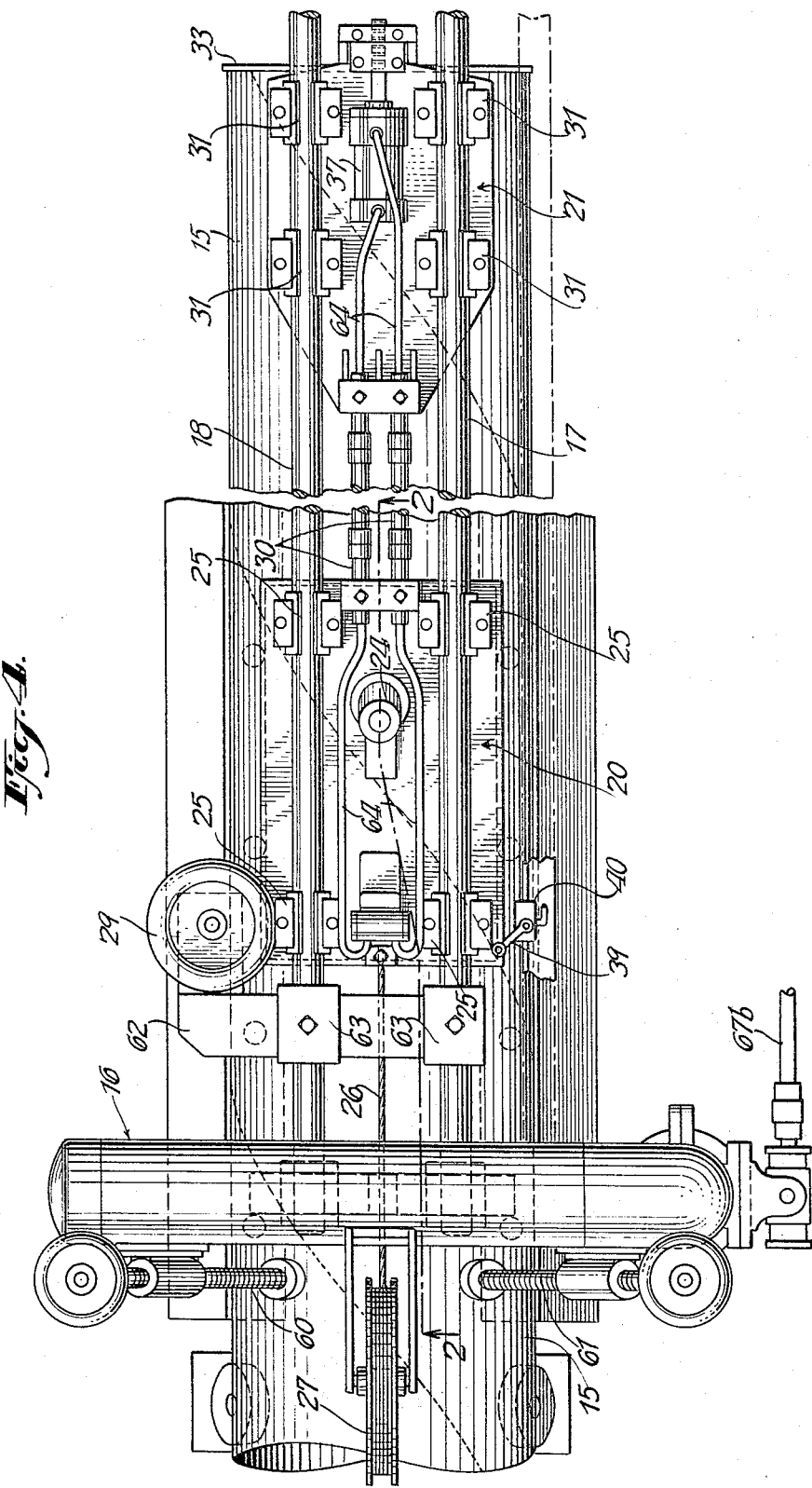

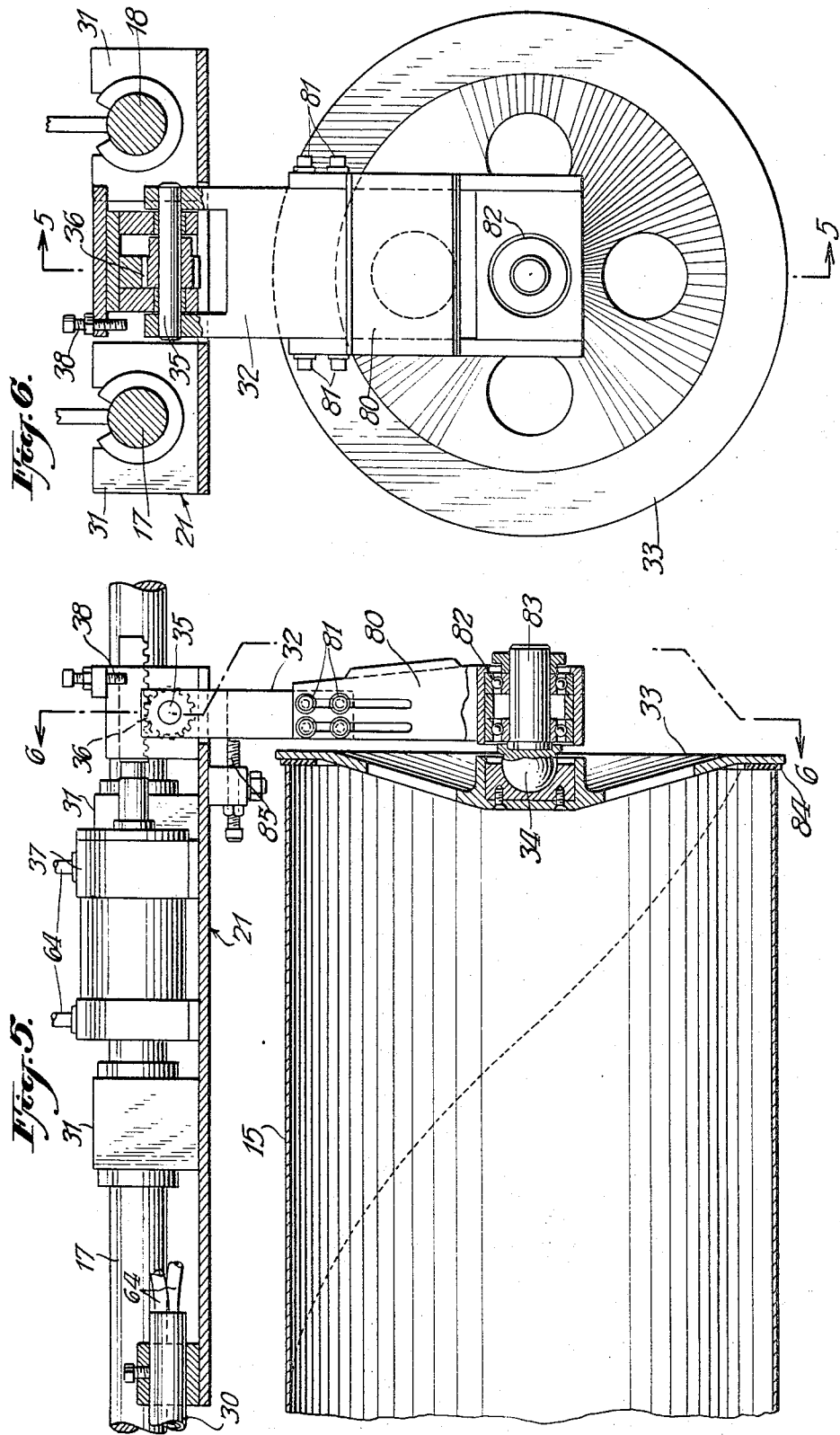

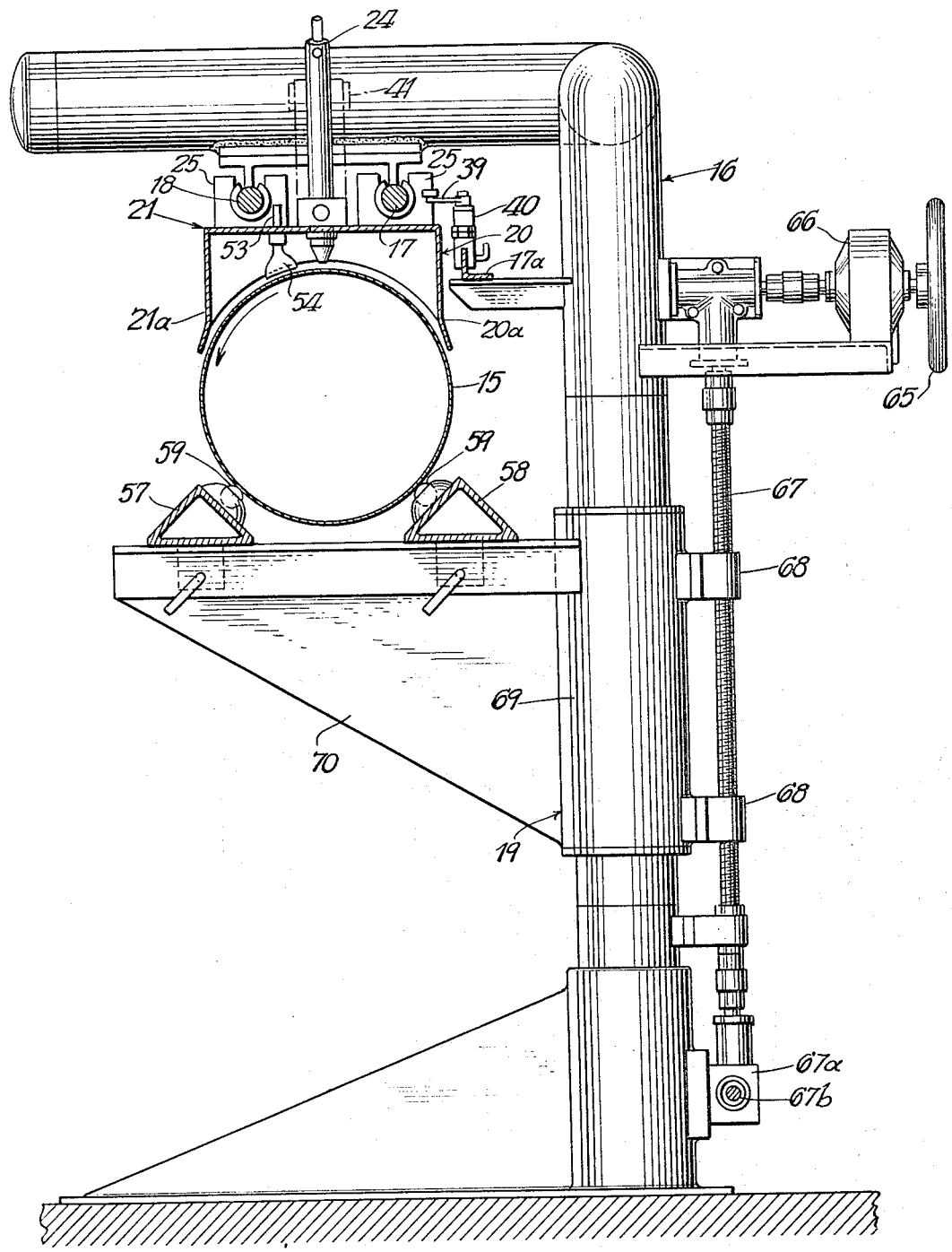

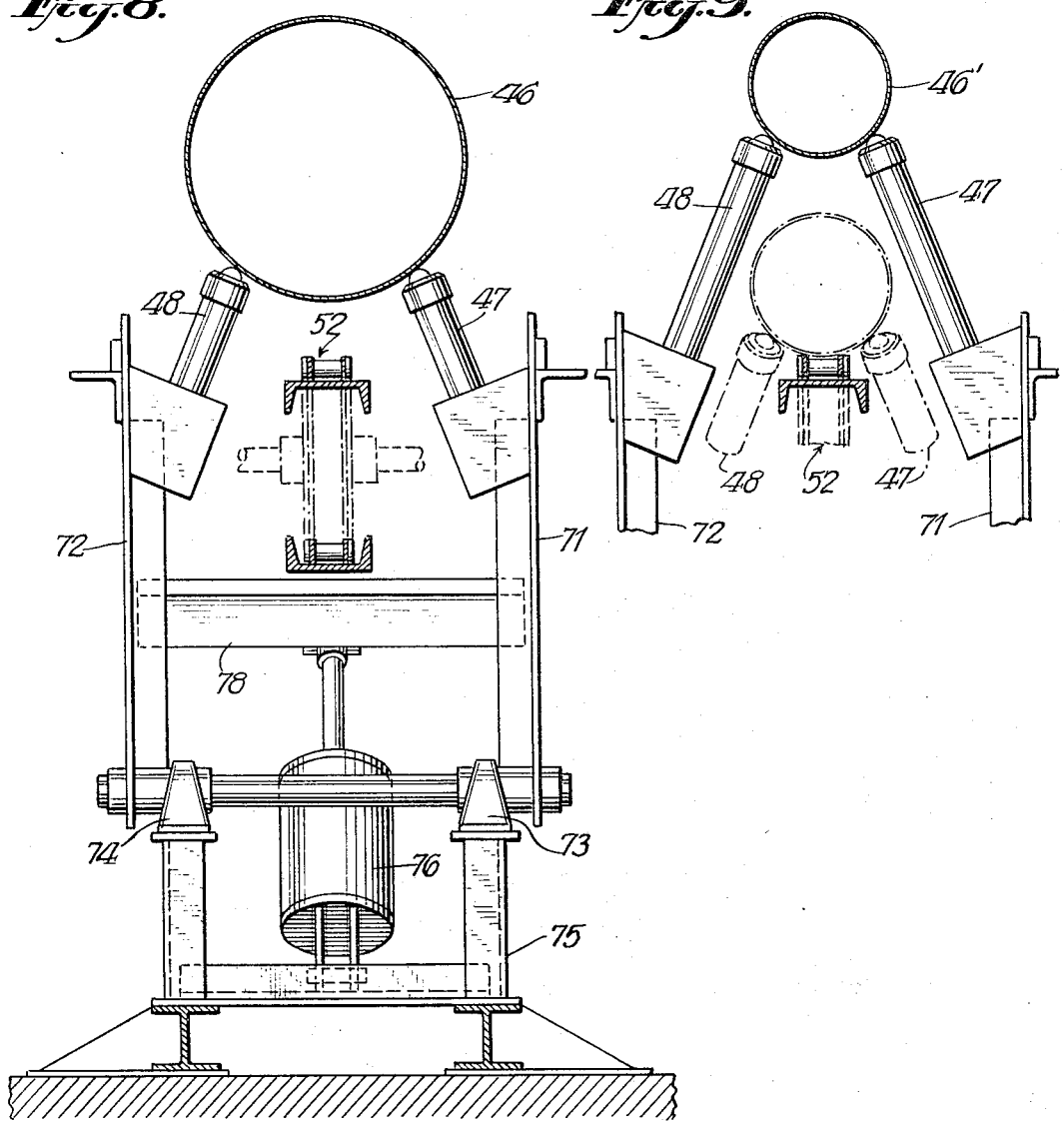

3,332,675
CUTTING METAL TUBING
James Bandura, Haworth, Henry A. Nelson Holland, Ridgewood, Harold M. McCall, Fairlawn, and George J. Gendron, Oradell, N.J., assignors to Raymond International Inc., New York, N.Y., a corporation of New Jersey
Filed June 9, 1964, Ser. No. 373,618
13 Claims. (Cl. 266—23)

This invention relates to the cutting of metal tubing, the apparatus of the invention being particularly adapted for cutting into predetermined lengths, metal tubing such as steel tubing, as the same is being progressively advanced from tube welding apparatus of the type wherein a metal strip becomes helically wound to form the tubing, while the strip edges are being welded along a helically-extending seam line.

As the tubing leaves such tube welding apparatus, it advances longitudinally of its axis while also rotating at a speed depending upon its helix angle. The apparatus of the present invention serves to cut such advancing and rotating tubing into predetermined lengths, which, after severing, are advanced away on suitable conveying apparatus, all without interrupting the advancing and rotational movements of the tubing leaving the tube forming apparatus.

Preferably in accordance with the invention, the cutting of the tubing is accomplished by the use of any suitable known form of so-called plasma-jet torch, which is capable of rapidly forming a narrow transverse gap in the tube wall as the tubing rotates, with the jet directed generally radially toward the tubing. By the use of such plasma torches for the purposes, the cutting can be accomplished with sufficient rapidity to avoid interruption of the advance of the tubing from the tube forming apparatus and without the necessity of using mechanical or other cutting equipment of the various other available types requiring frequent sharpening, or replacement of parts.

In accordance with the invention, the tube-severing means preferably, although not necessarily for all aspects of the invention, comprises such a plasma-jet torch, so mounted on movable carriage means that automatically at a predetermined moment, same will begin to advance longitudinally with the tubing until a predetermined length of tubing has been "measured," whereupon the torch is rendered active and, as the tube rotates, a transverse gap becomes cut in the tube wall, after which the operation of the torch is stopped and the cut-off length of tubing is conveyed away, while the carriage means for the torch is automatically brought back to its initial starting position. It has been found, however, that operation of equipment of this general character involves certain difficulties. First, the accurate "measuring" of the tube lengths presents a problem, that is, the measurement from the severed end of the tubing, as it is being advanced, back to the point thereon where the cutting means is to be initially applied. Such problem arises from the fact that the severed tube end is prone to be somewhat irregular, with possibly somewhat protruding portions or somewhat recessed portions at various points around its periphery. Thus, if whatever device is used for automatically sensing the location of the severed end of the tubing, should come into contact with one of these irregular portions, it will not present a means for giving an accurate measure of the location of the severed end as a whole, and if a succession of tube lengths is cut with each length based on such inaccurate sensing, the inaccuracies in "measuring" successive lengths, may become quite serious and cumulative. This problem, however, is avoided with the present invention by providing means for sensing the location of the severed end of the tubing in the form of a disk or disk-like element, or spider element, for engaging the end of the tubing at a plurality of points or at numerous points around its periphery, such element being mounted on a universal joint or ball and socket-like means at the axis of the tubing and so that the center of such joint at such axis, may be taken as demarking the location of the forward end of the severed tubing, from which location the measurement may be started for the next succeeding length of tubing to be severed. In other words, this method of demarking the location of the end of the tubing will give a fair measure of the average extent to which the end of the severed tubing may extend, even though various points around its periphery may protrude considerably more or less than other points.

Another problem involved with the use of such plasma-jet torch means for severing tubing, arises from the fact that volumes of troublesome gases and clouds of fine oxide particles are given off from the area of the jet during its operation, and with a considerable part of such troublesome material being formed within the tubing, so that, unless effective preventative means are provided, the gases and oxides will be conducted in the tubing in both directions, viz. back to the welding and forming apparatus causing fouling thereof, as well as forwardly into the working spaces of the building. In accordance with the present invention, a suitable jet or jets of streams of water are projected through the aperture in the tubing being cut by the plasma jet, and preferably so that in large measure the fumes and oxide particles will be swept into the interior of the tube length being cut off, and so that the moisture and spray will prevent the objectionable material from escaping out of such tube, and then, as the tube is cut off, it is preferably lowered first to a rearwardly inclined position before being conveyed away, so that the water therein will wash the emanated material back out of the severed tube length.

Further aspects of the invention involve solutions of various mechanical problems of controlling the positioning and actuation of the apparatus, including the apparatus for causing the inclined movement of the tubing onto the conveying equipment, as well as means for properly controlling the return of the torch-bearing carriage to its initial position, and there stopping such return movement, with avoidance of abrupt and damaging hammering effects.

Various further and more specific objects, features and advantages of the invention will appear from the description given below, taken in connection with the accompanying drawings, illustrating by way of example a preferred form of the invention.

In the drawings:

FIG. 1 is a side elevational view of a presently preferred embodiment of apparatus for carrying out the invention;

FIG. 1a is a view further showing certain details at the discharge end of the apparatus;

FIG. 2 is an enlarged elevational view, partly in section, showing principally the carriage means for the torch;

FIG. 3 is a perspective view showing certain of the principal parts of the apparatus;

FIG. 4 is a plan view of various principal parts of the apparatus;

FIG. 5 is an enlarged elevational view of the portions of the apparatus shown in FIG. 1a;

FIG. 6 is a sectional view taken substantially along line 6—6 of FIG. 5;

FIG. 7 is a vertical sectional view taken substantially along line 7—7 of FIG. 1;

FIG. 8 is a vertical sectional view taken substantially along line 8—8 of FIG. 1; and FIG. 9 is a view of certain of the parts of FIG. 8 shown in a different position of operation, adapted for tubing of a smaller diameter.

Referring now to FIGS. 1 to 3 in further detail, the general arrangement of the apparatus will first be explained.

Metal tubing, for example of steel, is shown at 15 as same is being continuously advanced from apparatus (not shown) for helically forming and welding the tubing, same not only advancing from such apparatus axially, but also same is continuously rotating, at a speed depending upon the helix angle of the welded seam as related to the speed of longitudinal advance of the tubing. The tubing first passes a supporting stand or bracket means 16, which carries one end of each of a pair of rods 17 and 18, the other end portions of which are suitably supported on further supporting stand or bracket means 19, 19a and 19b.

A carriage means, generally indicated at 20, for the torch and associated apparatus, is slidably carried along rods 17 and 18, and another carriage means, generally indicated at 21, is slidably carried on the further ends of said rods for supporting means hereafter described for sensing the location of the severed end of the tubing and for determining the measurement of the tube lengths which are to be cut off.

Further important features of the invention and their functions will be apparent now from a brief description of the operation, particularly in connection with FIG. 3. Assuming that a length of tubing has just been severed at the right hand end portions of the apparatus, the carriage 20 carrying the plasma-jet torch 24, and carried by a plurality of bearings, as at 25, slidable along rods 17, 18, will now be drawn as a unitary assembly toward the left as by a wire or cable 26, which winds upon a reel 27 by the action of suitable tensioning means such as a spring 28. As the carriage 20 approaches the left hand end portions of the apparatus, side portions of same will engage a snubber 29 which, for example, may be in the form of a pneumatic tire, and which when engaged by the carriage 20, becomes compressed radially against the carriage, thereby providing a simple and convenient means for stopping the movement of the carriage without doing so abruptly.

Carriage 20 may be connected to the carriage 21 by a pair of rods 30, so that the carriage 21 will slide along with carriage 20 on bearings 31, slidable on the rods 17 and 18. On the carriage 21 a depending arm 32 is pivotally mounted (see FIGS. 1, 1a and 5) and carries at its lower end a disk-like element 33 supported at its center with respect to the arm 32, or an extension thereof, as by a ball and socket means at 34. As shown in FIG. 5, the arm 32 pivoted at 35 has a rack and pinion connection 36 with the plunger of a hydraulic cylinder 37, so that when the plunger moves to the right, the arm 32 and member 33 will be swung downwardly for engagement of the element 33 with the forward end of the advancing tubing 15, and when the plunger is moved to the left, the arm 32 will be swung up to a generally horizontal position and engage a stop-screw at 38.

Now, as the carriage 20 approaches the limit of its movement toward the left in FIG. 3, a portion of the carriage will engage an operating arm 39 on a reset switch 40, thereby actuating a solenoid 41, which in turn actuates a valve 42 controlling the flow of hydraulic fluid to the hydraulic cylinder and piston means 37 mounted on the carriage 21 and whereby the arm 32 is now swung downwardly so that the disk-like element 33 will now be in a position to be engaged by the advancing forward end of the tubing 15. And as soon as the tubing advances far enough to cause such engagement, the disk-like element and the arm 32 will cause the carriage 21 to be pulled to the right and, by reason of the connecting rods 30, also causing the carriage 20, which supports the torch 24, to be pulled to the right.

Thereafter a part of carriage 20 will engage and actuate switch means at 43 and then switch means at 44, which switches are connected through suitable means not here shown, for starting in operation the plasma-jet torch so that the cutting of an arcuately-extending slot in the advancing and rotating tube, will begin. The carriage 20 (being drawn forward by the disk element 33) will continue to advance at the same rate longitudinally as the tubing 15 and, inasmuch as the tubing is rotating, the arcuate slot will be cut by the torch circumferentially around through the tube walls until the tubing has rotated at least through approximately 360°, with the torch advancing longitudinally of the tubing at a sufficient speed so that the arcuate slot will be in a plane generally perpendicular to the axis of the tubing. Then the carriage 20 will engage stop-switch means 45, stopping the operation of the torch and also controlling suitable electrical and hydraulic circuits such that the hydraulic means 37 will now swing the disk-like element 33 upwardly out of the way of the forward end 46 of the severed tube length, and at approximately this time, the carriages 20 and 21 will again be free to be drawn back toward the left by the cable 26 and spring means in the reel 27 to be ready for the starting of the next cycle of operations.

It will be understood that the positions of the control elements or switches 40, 43, 44 and 45 may all be adjusted longitudinally along a supporting bar therefor, such as shown at 17a in order to provide for cutting different tube lengths and tubing having different rotational speeds.

Meanwhile the severed tube length will become supported upon pairs of upstanding supports as at 47, 48, 49 and 50 (see FIG. 1 and also FIG. 8), these supports being operated by suitable arrangements hereinafter further described, so that the rear end of the cut-off length of tubing (as at 51, FIG. 1) will be inclined downwardly and then the whole length will be deposited on suitable conveyor means 52, and thereby carried away.

Meanwhile, as best shown in FIG. 2, a supply of water through a pipe 53 is furnished to a suitable nozzle means 54 so positioned and arranged as to direct a spray of water of substantially ribbon-shaped cross-section onto the cutting area and into the arcuate slot 55 being cut by the torch 24. Such fumes and oxide particles as emanate from the exterior of the region of cutting will be kept from scattering by a hood portion 21a on carriage 21 (see FIG. 7) and largely drawn ultimately up into a hood 56 (FIG. 1) and discharged therefrom by suitable suction blower means (not shown). The oxides and fumes, however, which emanate from the torch-cutting area into the interior of the tubing 15, will be largely accumulated in the spray water which will become lodged in the length of tubing being cut off, and thus when the trailing end 51 of this length assumes an inclined position as shown in FIG. 1, the mixture of water, oxide particles and dissolved gases will flow out the end of said cut-off trailing end of the tube, such flow being aided by the rapid movement of the cut-off tube length forwardly on the conveyor 52.

While only one nozzle means 54 is shown, it will be understood that, if desired, other sprays may be provided at the region of the torch, if necessary, to prevent distribution into the atmosphere of toxic gases and troublesome oxide particles.

Further mechanical details will now be described with reference to the several figures. Referring principally to FIGS. 1 and 3, the advancing tubing 15 may be carried on a pair of longitudinally-extending supporting beams 57, 58, which at spaced-apart points thereon, carry suitable anti-friction rollers or the like 59. The tubing may be held down against the supports as by screw-rods 60, 61, terminating at their lower ends in suitable anti-friction means, the positions of the mountings for these rods being adjustable radially of the tubing to accommodate tubing of different sizes.

The snubber, viz. the pneumatic tire 29, may be carried on a supporting bracket 62, which in turn is carried by bearings 63 slidably adjustable, if desired, along the rods 17 and 18.

The rods 30 which interconnect the carriages 20 and 21 may be hollow so as to be adapted to contain hydraulic fluid pipes, as at 64, for the fluid control of the cylinder and piston means 37 on carriage 21. This allows for the adjustment of the spacing between the two carriages when cutting off different length pieces of tubing without having to separately adjust the fluid conduit lengths.

The supporting stands, such as at 16 and 19, and as further shown in FIG. 7, may have parts adjustable vertically to accommodate the apparatus to tubing of different diameters. This may be accomplished by turning a suitable handwheel 65 connected through suitable gearing at 66 to a screw-rod 67. The latter engages threaded lugs 68 on a sleeve 69 to vertically adjust the position of same on the stand so that a supporting bracket 70 as carried by sleeve 69 will adjust the vertical positions of the beams 57 and 58 carried thereby, thus adjusting these beams to accommodate the tubing of various diameters. At the lower end of the screw-rod 67, suitable gear connections at 67a may be provided for rotating the shaft 67b extending to the supporting stand 19 for adjusting the height of the parts thereon, shown in FIG. 1, and which enables adjustment vertically of the forward ends of beams 57, 58.

The end of the wire or cable 26 (see FIG. 2) may be suitably attached to carriage 21 as by lug and setscrew means 26', the position of the cable in this attachment means being adjustable whereby the effective tension of the spring 28 for moving the carriage may be varied.

The mechanism for operating the supporting means 47–50 for supporting the severed length of tubing, while depositing same on the conveyor 52, will now be further described in connection with FIGS. 1, 3 and 8. The supporting members, such as at 47, 48 (which may be made suitably adjustable in length) may carry suitable antifriction means such as balls at their upper ends, and their lower ends may be carried as by levers 71, 72 pivotally mounted on suitable bearing means respectively, as at 73, 74, supported on frame means 75. A hydraulic cylinder piston means 76 pivotally connected at its lower end to the frame of the apparatus, has its plunger rod 77 pivotally connected with respect to levers 71 and 72 as by way of crosspiece 78 (FIG. 8). The supporting members 49 and 50 (FIG. 1) for the forward end of the severed tube length, may be carried on like supporting structure actuated by cylinder and piston means 79. The hydraulic means 76 and 79 may be arranged to be operated by any suitable simple hydraulic circuit (not shown) in timed relation to the cutting off of the severed length of tubing, so that the trailing end 51 of such length will first be lowered to an inclined position, as above explained, toward the conveyor 52, followed by the lowering of the leading end also onto the conveyor. The supporting members 47 and 48 are shown in full lines in FIG. 9 in a different position of adjustment for engaging a smaller tubing 46'. The members 47 and 48 are shown in dotted lines in FIG. 9 at positions which they will assume when lowering the end of the severed tube length and carrying same somewhat forwardly onto the conveyor 52. Such downward, inclined and forward movement of the severed length will insure that the severed ends will separate without friction or jamming which would disturb the next cut.

Referring now in further detail to the arrangements on carriage 21, as shown in FIGS. 5 and 6, the supporting arm 32 carries at its lower end an extension piece 80 which in effect is vertically adjustable in length as by screw and slot means at 81 for carrying a bearing 82 at the proper location to be at the axis of tubing with the particular diameter being handled by the apparatus. The bearing 82 carries a rotatable shaft 83, the ball and socket means 34 being mounted at an end of this shaft for so carrying the disk element 33 that same may turn about its axis and also tilt in any direction to a limited degree about its axis.

At the periphery of the element 33, an annular ring wear piece 84 is mounted for engaging the rotating forward end of the tubing 15. Thus, if at some point or points around the peripheral end edge of the tubing, the metal should irregularly protrude more than at other points at diametrically opposite positions, then the disk element 33 will be tilted somewhat as it rotates together with the tube end, such tilting being to the extent necessary to have the element remain firmly seated against the end edges of the tubing. Yet the position longitudinally of the tubing axis, of the center of the ball and socket means 34, will be substantially accurately representative of the position of the intended plane along which the end of the tubing was severed. Thus the length of the next desired tube length to be severed may properly be measured from a distance starting at the position of such plane, thereby minimizing any such inaccuracies as might occur if the means provided for sensing the position of the end of the tubing were merely so made as to engage some point on the end edge which might not be fairly representative of the position of the whole perimeter.

At times after the disk element 33 has been swung to its downward position and before a forward end of the tube 15 engages same, the swinging of the arm 32 may be limited by stop means in the form of a setscrew 85.

The invention in another form thereof is adapted to operate as a stationary cut off apparatus. That is, the apparatus may be adapted to cut tubing which is intermittently advanced, thence rotated as compared to the foregoing example in which the metal tubing was continuously axially advanced while simultaneously being rotated. According to this form of the invention the carriages 20 and 21 are adjusted to a preselected distance one from the other depending upon the length of tubing to be cut. Thence, the carriages are retained in their selected fixed positions during the operation of the machine. The tubing 15 is fed axially into the machine (by means not shown) until the leading edge thereof engages the annular ring wear piece 84 at the periphery of the element 33, on the carriage. The ring 84 acts as a longitudinal stop and accurately positions the tubing longitudinally of the tubing axis.

Next, the tubing is rotated, by means not shown. Cutting means, such as the plasma-jet torch 24 is brought into operation so that an arcuate slot will be cut by the torch circumferentially around through the tube walls, the tubing being rotated at least 360°.

While the tubing is being rotated the element 33 will be tilted somewhat as it rotates together with the tube end, such tilting being to the extent necessary to have the element remain firmly seated against the end edges of the tubing to retain said end in the intended plane in order to measure off from such location the desired tube length to be severed, all in a manner similar to that described in connection with the continuously advancing and rotating embodiment.

Subsequent to the cutting operation, the cut tube is removed from the machine and the cycle of operation is repeated.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for severing predetermined lengths of tubing from tubing which is continuously advancing while being rotated, said apparatus comprising in combination: first and second interconnected carriage means slidably mounted to move longitudinally of the advancing tubing; plasma-jet torch means mounted on said first carriage means in a position to direct its torch against the outer surface of the rotating tubing for circumferentially cutting a slot around the tube walls as the tubing rotates and advances; an element on said second carriage means for engaging the forward end edge of the advancing tubing and acting thereby directly to pull the first and second carriage means slidably along with and at the same speed longitudinally as the advancing tubing; control means mounted at a predetermined position along the path of movement of the carriage means for starting operation of said torch to cause same to start such cutting action at a point on the tubing at a predetermined distance back from its forward end edge as engaged by said element; control means at a predetermined location along the path of movement of the tubing for stopping operation of said torch after the tube has made at least about one complete revolution; means whereby the latter control means also then actuates said element to remove same from engagement with the forward end of the tubing, thus releasing the carriage means from further advancing; and means for then automatically withdrawing the carriage means back to positions preparatory for another cycle of operation.

2. Apparatus for severing predetermined lengths of tubing from tubing which is continuously advancing while being rotated, said apparatus comprising in combination: first and second interconnected carriage means slidably mounted to move longitudinally of the advancing tubing; torch means mounted on said first carriage means in a position to direct its torch against the outer surface of the rotating tubing for circumferentially cutting a slot around the tube walls as the tubing rotates and advances; an element pivotally mounted on said second carriage means for swinging into engagement with the forward end edge of the advancing tubing and acting thereby directly to pull the first and second carriage means slidably along with and at the same speed longitudinally as the advancing tubing; control means mounted at predetermined positions along the path of movement of the carriage means for starting and stopping operation of said torch to cause same to start such cutting action at a point on the tubing at a predetermined distance back from its forward end edge as engaged by said element and for stopping such operation after the tube has made at least about one complete revolution; means whereby the control means also then actuates said element to swing same from engagement with the forward end of the tubing, thus releasing the carriage means from further advancing; and spring-tensioned means for normally applying force to said carriage means to maintain said element in engagement with said forward end of the tubing until such release and for then drawing the carriage means back to positions preparatory for another cycle of operation.

3. Apparatus for severing predetermined lengths of tubing from tubing which is continuously advancing while being rotated, said apparatus comprising in combination: first and second interconnected carriage means slidably mounted to move longitudinally of the advancing tubing; torch means mounted on said first carriage means in a position to direct its torch against the outer surface of the rotating tubing for circumferentially cutting a slot around the tube walls as the tubing rotates and advances; an element on said second carriage means for engaging the forward end edge of the advancing tubing and acting thereby directly to pull the first and second carriage means slidably along with and at the same speed longitudinally as the advancing tubing; control means mounted at a predetermined position along the path of movement of the carriage means for starting operation of said torch to cause same to start such cutting action at a location on the tubing at a predetermined distance back from its forward end edge as engaged by said element; control means at a predetermined location along the path of movement of the tubing for stopping operation of said torch after the tube has made at least about one complete revolution; means for thereafter actuating said element to remove same from engagement with the forward end of the tubing, thus releasing the carriage means from further advancing; and spring-driven means for normally applying force to said carriage means to maintain said element in engagement with said forward end of the tubing until such release and for then withdrawing the carriage means back to positions preparatory for another cycle of operations.

4. Apparatus in accordance with the foregoing claim 3 and in which snubbing means is provided to check the withdrawing movement of the carriage means, such snubbing means comprising a rotatable inflated tire or the like mounted to one side of the path of travel of said carriage means and the periphery of which is at a position to be compressed generally radially thereof and transversely of said path by engagement with a portion on the carriage means.

5. In combination with apparatus for severing predetermined lengths of tubing from an elongated tubing member, means for sensing the approximate location of the plane of the forward end edge of the tubing to be severed, in order to measure off from such location the tube length to be severed, said means comprising: an element adapted to engage a plurality of points on said forward end edge; and universal joint means on which said element is supported, said joint means having its center approximately on the center line of said tubing to be severed.

6. In combination with apparatus for severing predetermined lengths of tubing from tubing which is advancing longitudinally while rotating, means for sensing the approximate location of the intended plane along which the forward end edge of such advancing tubing was previously severed, in order to measure off from such location the next tube length to be severed, said means comprising: an element adapted to engage a plurality of points on said end edge of the advancing tubing; means for carrying said sensing element to move longitudinally of the axis of the tubing when such element engages said end edge; and universal joint means on which said element is supported on said carrying means, said joint means having its center approximately at said axis.

7. In combination with apparatus for severing predetermined lengths of tubing from tubing which is advancing longitudinally while rotating, means for sensing the approximate location of the intended plane along which the forward end edge of such advancing tubing was previously severed, in order to measure off from such location the next tube length to be severed, said means comprising: an element adapted to engage a plurality of arcuately spaced points around on said end edge of the advancing tubing; means for carrying said sensing element to move longitudinally of the axis of the tubing when such element engages said end edge; and universal joint means on which said element is supported on said carrying means, said joint means having its center approximately at said axis and substantially in said plane.

8. In combination with apparatus for severing predetermined lengths of tubing from tubing which is sequentially advanced and thence rotated, means for sensing the approximate location of the plane of the forward end edge of the tubing to be severed, in order to measure off from such location the tube length to be severed, said means comprising an element adapted to engage a plurality of points on said forward end edge; universal joint means on which said element is supported, and said joint means having its center approximately on the center line of said tubing to be severed and permitting said element to tilt in various directions depending on irregularities in the formation of said edge at its points of engagement with said element.

9. In apparatus for severing predetermined lengths of tubing from tubing which is advancing longitudinally, means for sensing the approximate location of the plane along which the forward end edge of such advancing tubing was previously severed in order to permit measuring off from such location the next tube length to be severed, said means comprising: an element having an annularly positioned portion adapted to engage a plurality of points on said end edge of the advancing tubing; means for carrying said sensing element to move longitudinally of the axis of the tubing when such element engages said end edge; and ball and socket joint means on which said element is supported on said carrying means, said joint means having its center approximately at said axis and permitting said element to tilt in various directions depending on irregularities in the formation of said edge at its points of engagement with said element.

10. In apparatus for severing predetermined lengths of tubing from tubing which is advancing longitudinally while rotating, means for sensing the approximate location of the plane along which the forward end edge of such advancing tubing was previously severed in order to permit measuring off from such location the next tube length to be severed, said means comprising: an element adapted to engage a plurality of oppositely disposed points around on said end edge of the advancing tubing; means for carrying said sensing element to move longitudinally of the axis of the tubing when such element is engaged by said end edge; universal joint means on which said element is supported on said carrying means, said joint means having its center approximately at said axis; additional carrying means movable longitudinally of the tubing for supporting torch means for severing the tubing, said carrying means being interconnected whereby when said element is engaged by the advancing forward end edge of the tubing, the carrying means including said torch are longitudinaly moved with the tubing; means for starting and stopping the severing operation of the torch during the latter movement and for then shifting said element out of contact with the tube end after a tube length has been severed by the torch; and means for then automatically moving the carrying means longitudinally back to positions for starting the next cycle of operation.

11. Apparatus for severing predetermined lengths from advancing tubing, comprising in combination: plasma-jet torch means mounted and carried in a position to direct its torch against the outer surface of the tubing for cutting a slot around the tube walls as the tubing advances and rotates; means for projecting a spray of water at the region of such slot and therethrough during its formation for suppressing distribution of gases and oxide particles around the region of the slot and within the tubing; means for supporting and engaging the lengths of tubing after being severed; means for so actuating said supporting means as initially to move the severed tube length forwardly and to tilt one end portion thereof downwardly to permit water from the spray and entrained particles to flow out of such end; and a conveyor for conveying away said severed lengths of tubing, said supporting means acting to deposit the severed lengths on such conveyor means after the tilting thereof.

12. Apparatus in accordance with the foregoing claim 11 and in which hydraulic cylinder and piston means are provided for actuating said supporting means in timed relation to the severance of the tube lengths.

13. Apparatus for severing predetermined lengths of tubing from tubing which is continuously advancing longitudinally while being rotated, said apparatus comprising in combination: plasma-jet torch means mounted and carried in a position to direct its torch against the outer surface of the rotating tubing for circumferentially cutting a slot around the tube walls as the tubing rotates and advances; and means for projecting a spray of water adjacent the torch onto the region of such slot and therethrough during its formation, for suppressing distribution of gases and oxide particles around the region of the torch and within the tubing, and whereby a substantial portion of the oxide particles emanating from the region of the torch becomes washed into the tubing.

References Cited

UNITED STATES PATENTS

| | | | |
|---|---|---|---|
| 2,301,236 | 11/1942 | Yoder | 83—292 X |
| 2,302,182 | 11/1942 | Bucknam | 266—23 X |
| 2,753,586 | 7/1956 | Metz | 287—87 X |
| 2,922,869 | 1/1960 | Giannini | 219—75 |
| 3,100,255 | 8/1963 | Miller | 219—70 |
| 3,178,974 | 4/1965 | Roess | 83—292 X |

JOHN F. CAMPBELL, *Primary Examiner.*

ROBERT F. DROPKIN, *Assistant Examiner.*